Figure 3:
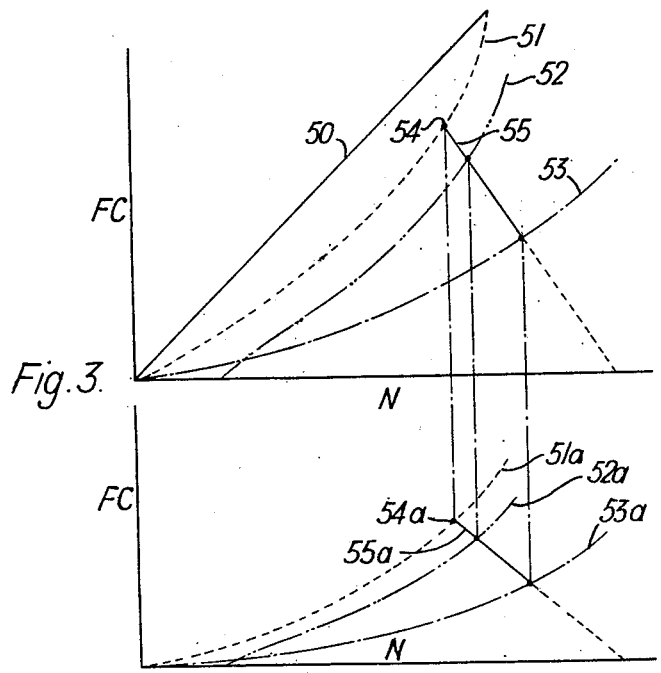

June 4, 1963 G. C. MAY ETAL 3,091,925
GAS TURBINE ENGINE FUEL CONTROL WITH PLURAL SLEEVE VALVES
Filed July 22, 1958 3 Sheets-Sheet 1
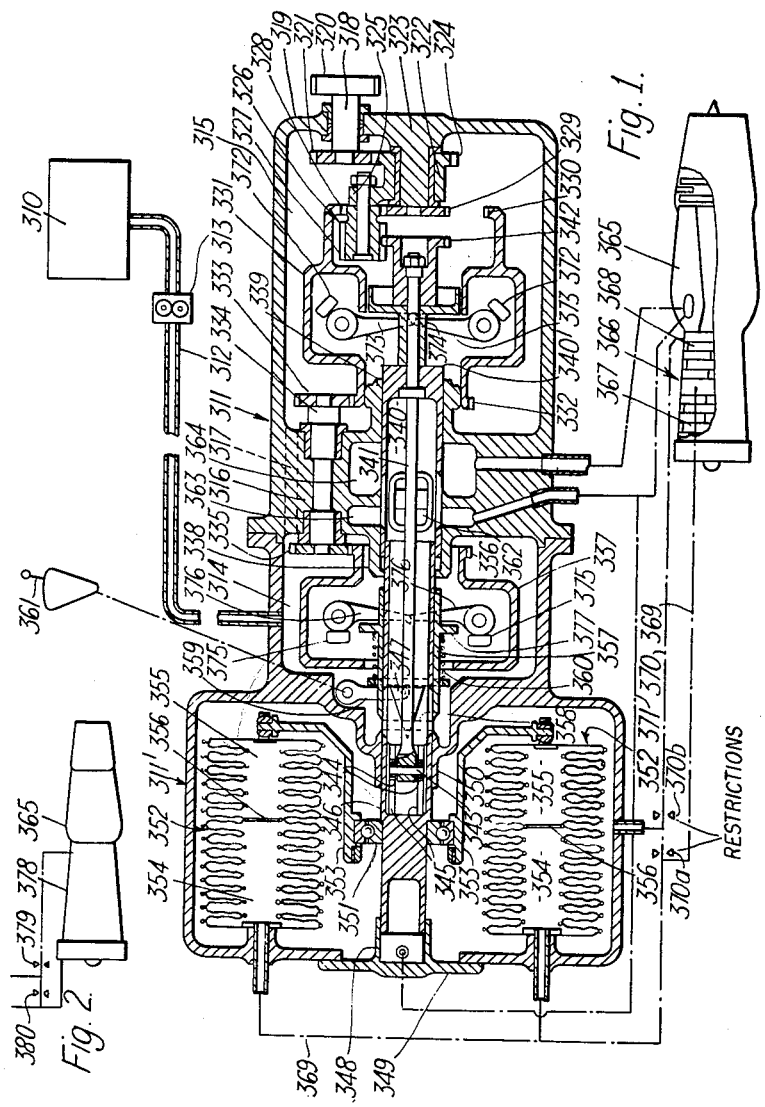
Inventors
Gordon Cyril May
Charles Gordon Morley
By
Leech & Radue Attorneys June 4, 1963 G. C. MAY ETAL 3,091,925
GAS TURBINE ENGINE FUEL CONTROL WITH PLURAL SLEEVE VALVES
Filed July 22, 1958 3 Sheets-Sheet 2

Inventors
Gordon Cyril May and
Charles Gordon Morley
By
Fred E. Shoemaker and
Fred L. Witherspoon, Jr. Attorneys

United States Patent Office 3,091,925
Patented June 4, 1963

3,091,925
GAS TURBINE ENGINE FUEL CONTROL WITH
PLURAL SLEEVE VALVES
Gordon Cyril May, Derby, and Charles Gordon Morley,
Ashbourne, England, assignors to Rolls-Royce Limited, Derby, England, a company of Great Britain
Filed July 22, 1958, Ser. No. 750,188
Claims priority, application Great Britain June 11, 1958
12 Claims. (Cl. 60—39.28)

This invention relates to a gas turbine engine fuel system in which fuel flow is metered through an orifice in accordance with a controlled pressure drop across the orifice.

An object of the invention is to provide a simple hydraulic arrangement which will give reasonably accurate control of acceleration and deceleration and will operate satisfactorily throughout a range of atmospheric pressures.

According to the present invention there is provided a gas turbine engine fuel system for controlling the supply of pressurized fuel from a source thereof to a burner of a gas turbine engine comprising a fuel supply control unit, means in said control unit providing an orifice, means for supplying pressurized fuel from said source to said burner via said control unit and orifice, means for varying the size of the orifice in accordance with engine rotational speed and, independently, in functional relationship with the ratio of the outlet and intake pressures, $P_2$ and $P_1$, of a compressor of the engine, and means for metering the fuel flow to the burner in accordance with the pressure drop across the orifice.

Preferably the full flow of fuel from the source to the burner passes through the orifice. This arrangement obviates the use of servo valves which tend to stick and require filtering of the fuel.

The orifice may be in the form of a slot, the width of which is controlled by means responsive to engine rotational speed, in combination with a movable plate, or a movable aperture, which is adapted to provide an increase or decrease in the area of the orifice directly proportional to the movement imparted to the plate or aperture by means movable in response to the compressor ratio i.e. the ratio of the outlet to the intake pressure of the compressor.

Preferably, however, the orifice is constituted by apertures in a pair of relatively movable concentric cylindrical members one of which is mounted closely within the other, the means for varying the size of the orifice effecting relative movement of the cylindrical members so as to vary the relative positions of the apertures therein.

In order to diminish the risk of sticking between the said concentric cylindrical members it is desirable to arrange that these members are relatively rotatable and relatively slidable axially, the means for varying the size of the orifice effecting relative axial movement of these members, and means being provided for effecting relative rotation of these members.

Preferably one of said cylindrical members is in two axially spaced parts which are relatively movable axially so as to vary the size of the aperture between said parts, at least one of said axially spaced parts being relatively rotatable with respect to the other cylindrical member. The other of said cylindrical members may be axially movable and provided with at least one circumferential aperture of varying cross-section axially e.g. of triangular cross-section.

The relative movement of the cylindrical members may be controlled by pressure responsive means, opposite faces of said pressure responsive means being adapted to be supplied with air at the said pressures $P_1$, $P_2$, or at pressures functionally related thereto. Thus there may be two pressure responsive means connected to diametrically opposite sides of one of said cylindrical members so as to effect axial sliding movement thereof. It will be appreciated that the provision of the two pressure responsive means ensures a balanced push or pull.

Preferably the means for metering the fuel flow to the burner in accordance with the pressure drop across the orifice comprises a valve member axially movable in a valve body, the valve member controlling fuel flow from the orifice to the burner, opposite sides of the valve member being subjected to the pressures on opposite sides respectively of the orifice, the valve member also being axially positionable in dependence upon engine rotational speed. Desirably, means are provided for effecting relative rotation between the valve member and the valve body.

In one particular form of the invention, which is especially suitable for aircraft engines, the orifice is disposed axially within a generally cylindrical control unit. Preferably the concentric cylindrical members and the valve member are also mounted axially within the cylindrical control unit.

The pressurized fuel can be supplied by any fuel pump such as a centrifugal pump, a variable capacity pump, or a fixed capacity pump with an excess flow by-pass or relief valve. If a variable capacity pump is used, and it is not desired to by-pass excess fuel, the pump capacity can be varied in accordance with the pressure of fuel flowing to the burner by applying the latter pressure to a resiliently-loaded pressure-sensitive device adapted to actuate a pump capacity changing mechanism.

If desired, the flow to a pilot burner can be taken directly from the downstream side of the orifice so that only the main fuel supply passes through the valve body mentioned above. The flow to the pilot burner can be maintained at all times, thus avoiding the use of a "pressurizing" valve.

Figure 3A:
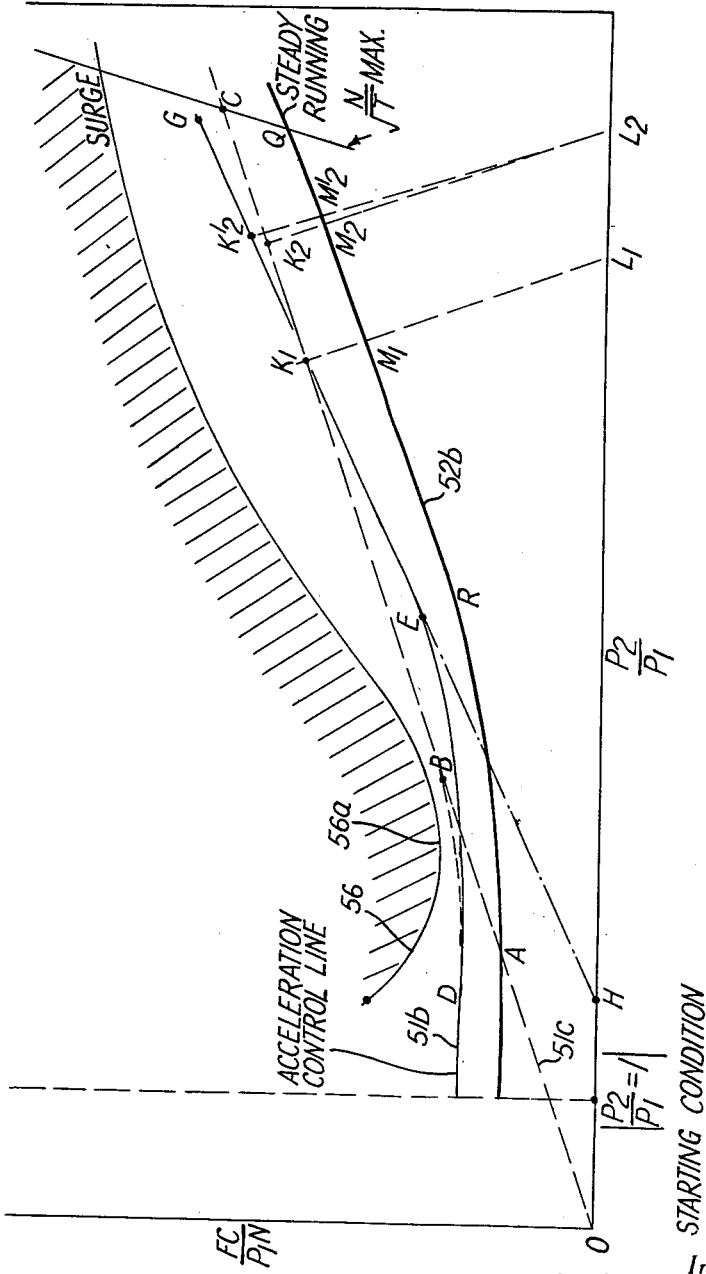

The invention is illustrated, merely by way of example, in the accompanying drawings in which:

FIGURE 1 is a diagrammatic representation of a preferred embodiment of the fuel system according to the invention as applied to a two-shaft gas turbine engine, FIGURE 2 is a diagrammatic view of a gas turbine engine having a single stage compressor which is connected to the fuel system shown in FIGURE 1, and FIGURES 3 and 3a are graphical representations of the working of the fuel system according to the invention.

Referring now to the drawings, a fuel tank 310 is connected to a fuel control unit 311 by means of a conduit 312 and interposed in the conduit is a main fuel pump 313 which is of the positive displacement type. The control unit 311 is generally cylindrical in cross-section and is provided with two chambers 314, 315 which are separated by means of a wall 316, communication between the two chambers 314 and 315 being provided for by means of a bore 317 extending axially through the wall 316. A spindle 318 passes through and is rotatably mounted in the end wall 319 of the chamber 315. Securely mounted on the spindle 318 at its ends outside and inside the chamber 315 are gear wheels 320, 321 respectively. The gear wheel 320 is driven (by means not shown) from the engine.

A sleeve 322 is freely rotatable on a bushed spigot 323 formed on the inner face of the end wall 319. The sleeve 322 is formed integrally at opposite ends with a gear wheel 324 and a radial arm 325, the gear wheel 324 meshing with the gear wheel 321 on the spindle 318. The radial arm 325 supports two freely rotatable compounded gears 326. The two compounded gears 326 comprise a long face width gear wheel 327 and a gear wheel 328. The gear wheel 328 meshes with a fixed gear wheel 329, carried by the spigot 323, and with teeth 330 formed internally on one end of a first, rotatable, governor housing 331. It will be seen therefore that as the gear wheel 324 is caused to rotate, the gear wheel 328 rotates about the gear wheel 329 with a planetary motion and because of its interengagement with the internally toothed portion 330 of the housing 331, the housing 331 is also rotated about its axis.

The housing 331 is provided with an externally toothed portion 332 on its other end which meshes with a gear wheel 333. The gear wheel 333 is carried on one end of a freely rotatable shaft 334 which passes through and is supported in the wall 316. Mounted on the other end of the shaft 334 is a further gear wheel 335 which meshes with an externally toothed portion 336 of a second, rotatable, governor housing 337. Thus the engine drive to the gear wheel 320 effects rotation of the housings 331, 337.

The dividing wall 316 is provided with two axially spaced apart aligned bearings 338, 339 which support between them an axially movable sleeve 340 which is mounted within the said bearings. A rod 341 extends axially through the sleeve 340 and that end thereof which is adjacent the end wall 319 of the control unit 311 has a gear wheel 342 mounted thereon, the said gear wheel 342 meshing with the long face width gear 327 of the two compounded gears 326. The gear 327 will thus effect rotation of the sleeve 340 whilst permitting axial movement thereof. The end of the rod 341 remote from the said wall 319 has a pin 343 mounted therein which is arranged transversely of the rod axis and supports a roller bearing 344 on each of its ends, the bearings 344 being disposed in diametrically opposite axially-extending grooves 345 formed in the bore of a further sleeve 346.

The sleeve 346, which is provided with four, circumferential, triangular apertures 347 which are regularly spaced apart angularly, is supported at one end by the bearing 338 and at its other end by a bearing 348 formed in a cap member 349 supported by the casing of an enlarged end portion 311' of the control unit 311. The sleeve 346 is also supported substantially midway of its length by a bearing 350 formed internally of the casing of the control unit 311. One end of the sleeve 346 extends into the sleeve 340 so that the interiors of the two sleeves intercommunicate.

A bearing 351 is secured to and mounted on the sleeve 346 and the outer race of the bearing 351 is connected to two diametrically opposed capsules 352 by two diametrically opposed arms 353. Thus, as the capsules 352 collapse and expand, the sleeve 346 moves axially. Each capsule 352 is divided into two compartments 354 and 355 by a dividing wall 356, the compartment 355 being evacuated. The capsules 352 are housed in the end portion 311' of the control unit 311, the said end portion being sealed from communication with those parts of the control unit containing fuel.

A sleeve 357 is mounted on the sleeve 346 for axial sliding movements but is held against rotation (by means not shown). The sleeve 357 and the bearing 350 are so formed and positioned as to define between them a variable area, annular, sharp-edged slot 358.

The sleeve 357 is movable axially between adjustable stops, not shown, which define the maximum and minimum widths of the slot 358, variation of the width of the slot 358 is effected by means of a forked member 359 which engages a spring 360 carried by the sleeve, and which is interposed between the member 359 and a flange 377 on the sleeve, the member 359 being connected to the pilot's throttle lever 361 in the usual manner.

The width of the slot 358 is also variable in accordance with engine rotational speed in a manner which will hereinafter be described. Four circumferential apertures 362, which are regularly spaced apart angularly, are provided in the sleeve 340 for communication with two axially spaced ports 363 and 364 in the dividing wall 316, the ports 363 and 364 communicating with the primary or pilot and main burners respectively of the gas turbine engine 365.

The engine 365, shown in FIGURE 1 of the drawings, is provided with a two stage compressor 366 and air (at a pressure $P_1'$ which is a function of the compressor intake pressure $P_1$) from a point intermediate of the two stages 367, 368 of the compressor is fed into the part 354 of each capsule 352 via a conduit 369, whilst delivery air (at the compressor outlet pressure $P_2$) from the second stage 368 of the compressor 364 is delivered, by way of a conduit 370 from a point intermediate of two restrictors 370a and 370b, in the conduit, into the casing of the part 311' so as to surround the capsules 352. It will be seen, therefore, that as the engine speed and compressor delivery pressure $P_2$ increase, the capsules 352 will be progressively collapsed and the sleeve 346 will be caused to move to the left (as seen in FIGURE 1) and present an increased area of its triangular orifices 347 to the annular orifice 358.

The pressure within the casing 311' externally of the capsules 352 is $$P_1 F\left(\frac{P_2}{P_1}\right)$$

as will be clear from the following explanation.

Flow, at a temperature $T_1°K.$, through a restriction on opposite sides of which the pressures $P_2$, $P_1$ prevail, may however be shown to be given by:

$$Q=\frac{M\sqrt{T_1}}{AP_2}=f\left(\frac{P_2}{P_1}\right)$$

where A=the area of the restriction and M=the mass flow (see Jamison and Mordell, Ministry of Aircraft Production, R & M No. 2031, 1950).

When, however, the velocity through the restriction becomes sonic, the downstream pressure can no longer influence the flow and Q becomes constant and the orifice is said to be "choked."

Suppose now that the areas of the restrictions 370b, 370a are $A_1$, $A_2$ respectively and suppose that there is no loss or gain of heat from the system so that gas temperature is the same at each of the restrictions 370b, 370a and that the mass flow is the same through each of them. Then $$\frac{M\sqrt{T_1}}{A_1P_2}=\frac{M\sqrt{T_1}}{A_2X_1}$$

where X=pressure intermediate of the restrictors 370a, 370b and within the casing 311'.

$$\therefore \frac{P_2}{X}=\frac{A_2}{A_1}$$

$$\therefore X=\frac{A_1}{A_2}\cdot P_2$$

$$=P_1'\frac{A_1}{A_2}\left(\frac{P_2}{P_1'}\right)$$

$$=P_1'F\left(\frac{P_2}{P_1'}\right)$$

Where F is a function whose value depends upon the value of the restrictors 370a, 370b.

Thus the sleeve 346 will be moved in dependence upon the value of $$P_1'F\left(\frac{P_2}{P_1'}\right)$$

In order to pressure balance the sleeve 346 the bore of the bearing 348 is placed in communication with the port 363 by means of a conduit 371.

Mounted within the first governor housing 331 is a centrifugal governor having weights 372 and arms 373, the arms 373 engaging a flanged sleeve 374 carried on the rod 341. The rod 341 serves to secure the sleeves 340, 374 together so that the position of the sleeve 340 will be controlled by the said centrifugal governor. The governor weights 372 may be of a material of a density about twice the density of the fuel in order to compensate the fuel flow for variations in fuel density.

Similarly, there is mounted within the second governor housing 337 a centrifugal governor having weights 375 (which should be as dense as possible) and arms 376, the arms 376 engaging the flange 377 on the sleeve 357.

In operation, and assuming that the parts of the apparatus are initially in the position shown in FIGURE 1, the chambers 314 and 315 will fill with fuel at the outlet pressure of the pump 313 and the said fuel will enter the sleeves 346, 340 via the orifice constituted by the annular slot 358 and triangular apertures 347. The sleeves 340 will be urged to move to the left (as seen in FIGURE 1) because of the pressure difference across its internal and external faces, which difference is equal to the pressure drop across the orifice constituted by the annular slot 358 and the apertures 347.

Simultaneously with the urging of the sleeve 340 to the left, the arms 373 of the governor in the housing 331 are moved into engagement with the flanged sleeve 374 by the centrifugal action of the governor weights 372 whereby the said arms 373 urge the sleeve 340 to the right of the drawing. The sleeve 340 will be so positioned by these opposed forces that it meters fuel through the port 363 to the primary burner of the engine and, according to its position, selectively through the port 364 to the main burners of the engine. It will be seen therefore that the position of the apertures 362 in relation to the ports 363 and 364 controls the fuel flow through the orifice 347 and 358, since, should the pressure drop across the said orifice become excessive, the sleeve 340 is moved to the left by the pressure difference across its internal and external faces, thereby reducing the fuel flow to the burners until the pressure drop across the orifice has been reduced, whereupon the governor arms 373 are permitted to move the sleeve to the right to increase the fuel flow to the main burners.

As engine speed increases, the governor arms 373 in the first governor housing 331 move the sleeve 340 further to the right, whereby fuel flow to the burners is increased. The disposition of the sleeve 340, and hence the flow through the apertures 362 to the burners, will also be controlled by the pressure difference across the end wall 340' of the sleeve 340, the opposite faces of this end wall being respectively subjected to the outlet pressure of the pump 313 and the pressure prevailing downstream of the orifice 347, 358. Simultaneously, as the delivery pressure $P_2$ of the compressor increases, the capsules 352 are progressively collapsed and the sleeve 346 is moved to the left, whereby the triangular apertures 347 present a gradually increasing area to the annular slot 358, and the fuel flow through the ports 363 and 364 is therefore increased.

The operation as so far described is carried out independently of the setting of the throttle lever 361. When however, the engine rotational speed nears its maximum, for the setting of the throttle lever 361, the governor arms 376 in the second governor housing 337 cause the sleeve 357 to move to the left, as seen in FIGURE 1, whereby the width of the slot 358 is reduced and the fuel flow through the sleeve 340 is correspondingly reduced, thereby preventing the rotational speed of the engine exceeding the maximum for the throttle lever setting.

The sleeve 346 will be rotated by the rod 341 relatively to the sleeve 357. Thus if any dirt or ice is entrapped between the sleeves 346, 357 the rotation of the sleeve 346 will reduce the risk that sticking will prevent axial movement of the sleeve 346. Similarly, the rod 341 will effect relative rotary movement between the sleeve 340 and the bearings 338, 339 and this will reduce the risk that sticking will prevent axial movement of the sleeve 340.

FIGURE 2 of the drawings shows a gas turbine engine employing a single stage compressor 378 and in this particular case the delivery pressure $P_2$ of the compressor 378 is fed into the intake of the compressor after passing through two restrictors 379 and 380, whilst air is fed, from a point intermediate of the two restrictors, into the casing of the part 311' so as to surround the capsules 352. In this arrangement the dividing walls 356 within the capsules are not employed, and the capsules are evacuated.

Means, not shown, but of known kind, are provided for controlling the stroke of the pump 313 in accordance with fuel flow to the burners.

During acceleration, the two adjacent edges of the sleeves 357 and bearing 350 are moved to their maximum spaced apart distance and the rest of the system acts as an acceleration control unit.

In FIGURE 3, in the upper graph, the ordinate represents engine fuel consumption, (FC) and the abscissa represents engine rotational speed (N). The firm line 50 shows the relationship of these two quantities if no control is exercised, i.e. the pump 313 is kept in full stroke. The dotted line 51 represents the relationship when acceleration is controlled in accordance with the invention. The chain-dotted line 52 represents the engine demand at steady speed and the chain-dotted line 53 represents conditions when deceleration is controlled in accordance with the invention.

When the acceleration is controlled in accordance with the invention a point 54 will be reached at which it is arranged that the governor 376 will be brought into operation and the fuel flow will then drop along line 55 as the width of the slot 358 moves from its maximum towards its minimum value.

In FIGURE 3 the lower graph represents similar conditions for the same range of speeds at a lower $P_1'$, similar lines on the graph bearing the same reference numerals as in the upper graph, except for the addition of the suffix $a$.

It will be seen that the point 54$a$ and other points on the line 55$a$ are vertically below the corresponding points in the upper graph, i.e. speed of the engine at which the governor 376 will be brought into operation will be the same at the lower $P_1'$ and will not increase as is frequently the case with existing systems.

In FIGURE 3$a$, the ordinate of the graph represents $$\frac{FC}{P_1'N}$$

while the abscissa represents the engine compressor ratio $$\frac{P_2}{P_1'}$$

The line 56 is the compressor surge line; that is to say, the shaded area whose limit is defined by the line 56 is the area in which surging of the compressor occurs. It will be noted that the surge line 56 has a dip 56$a$ in it at moderate pressure ratios.

The heavy line 52$b$ is the "steady running" line; that is to say the line 52$b$, like the lines 52 and 52$a$, represents the fuel consumption at steady engine speeds.

The full line 51$b$ like the lines 51, 51$a$, is the preferred acceleration line; that is to say the line 51$b$ represents the preferred relationship when acceleration is controlled in accordance with the invention. It is of course essential to ensure that the acceleration control line 51$b$ is disposed between and does not cut the lines 56, 52$b$. If the acceleration control line 51$b$ cuts the line 56, surging of the compressor will occur, whilst if the acceleration control line 51$b$ cuts the line 52$b$, insufficient fuel will be provided at some stage to keep the engine running at steady speed.

As stated above, in the fuel system of the present invention the fuel is metered to the engine in response both to engine rotational speed and to $$P_1'F\frac{P_2}{P_1'}1$$

The simplest possible form of the function $$P_1' F\left(\frac{P_2}{P_1'}\right)$$

could be obtained by evacuating the capsules 352 and applying the pressure $P_2$ to the outside of them, the capsules 352 having a displacement proportional to the total force acting on them. This would, however, produce an acceleration control line 51c in the form of a straight line passing through the origin, and if this straight line were arranged to miss the dip 56a in the surge line 56 it would cut the steady running line 52b at A. This would mean that a very powerful starter motor would be needed to speed the engine up past the point A.

Alternatively the arrangement could be such that the capsules 352 did not completely close the metering orifice even at zero pressure. This, however, would result in an excessive fuel supply when the aircraft was flying at a high altitude.

It is therefore important that the part of the acceleration control line 51b corresponding to low compressor ratios should be curved so as to lie between the surge line 56 and steady running line 52b. This is effected in practice by reason of the fact that the casing 311', within which the capsules 352 are mounted, is connected to sources of $P_1'$ and $P_2$ by way of the restrictors 370a, 370b respectively.

When the air flow through the restrictor 370a reaches the velocity of sound it is said to "choke" and the value of the pressure $P_1'$ downstream of it cannot influence the mass flow therethrough or the pressure upstream of it. Thus once the restrictor 370a "chokes," the pressure in the casing 311' will be a constant fraction of $P_2$ no matter whether the restrictor 370b is "choked" or not. Thus once "choking" occurs, the portion BC of the acceleration control line 51c will be obtained.

At low compressor ratios $$\frac{P_2}{P_1'}$$

however, the restrictor 370a will be "unchoked" and the flow through it will be less than under "choking" conditions. The pressure drop across the restrictor 370b will therefore be reduced and the pressure in the casing 311' will be nearer to $P_2$. In the limit at starting conditions, $P_2 = P_1' =$ the pressure of the casing 311', since there will be no pressure drop and no flow. At starting conditions, the pressure $P_2$ will therefore be applied to the capsules 352. This, therefore, will produce a curved acceleration line DB which merges into the straight line BC.

The position of B on the acceleration line DBC can be altered by altering the shape of the restrictor 370a.

It will be noted that the line BC tends to approach the steady running line 52b at high pressure ratios. This tends to result in slow accelerations at high pressure ratios and also leads to a variation in governed speed with varying day temperature for any given setting of the spring 360 of the governor 376.

As regards the said variation in governed speed, this occurs because, if the engine inlet temperature $T_1$ varies, a given value of speed will be a variable value of $N/\sqrt{T}$ (and therefore $P_2/P_1'$ since there is a functional relationship between $N/\sqrt{T}$ and $P_2/P_1'$). Suppose for example, that at a given setting of the spring 360 of the governor 376 and at a high $T_1$, the governor 376 starts to reduce the size of the slot 358 at a point $K_1$ on the line BC. The fuel flow will, say, be reduced along a line $K_1L_1$ as the speed increases, the line $K_1L_1$ intersecting the steady running line 52b at $M_1$, whereby the controlled engine speed (corresponding to $M_1$) will be a calculable amount above the speed corresponding to $K_1$.

At a lower value of $T_1$, however, the governor 376 will start to reduce the size of the slot 358 at the same speed N and therefore at a higher value of $N/\sqrt{T}$ and of $P_2/P_1'$. Accordingly the governor 376 will start to reduce the size of the slot 358 at, say, a point $K_2$ on the line BC, the fuel flow being reduced along a line $K_2L_2$ which intersects the line 52b at $M_2$.

As will be seen from FIGURE 3a, the reduction of fuel flow between $K_2$ and $M_2$ is a smaller fraction of the initial fuel flow than the reduction of fuel flow between $K_1$ and $M_1$. The slot 358 will not therefore have to close so far to reduce fuel flow from $K_2$ to steady running conditions at $M_2$ as it will have to close to reduce fuel flow from $K_1$ to steady running conditions at $M_1$. Moreover, although the point $M_2$ represents a higher speed than the point $K_2$, the speed differential between these points is smaller than between the points $K_1$ and $M_1$. In other words, as $T_1$ falls, there is a corresponding reduction in the increase of engine speed which occurs from the point where the governor 376 starts to reduce the size of the slot 358 to the point where steady running conditions are reached. Accordingly the speed to which the engine is controlled will fall with $T_1$.

A preferred feature of the present invention is therefore to provide means which ensure that the controlled speed does not substantially vary with $T_1$. This is effected by causing the fuel supply to be controlled as indicated by the preferred acceleration line 51b, the line 51b having a straight portion EG which, if produced, would cut the zero fuel axis at approximately the same point H as would be cut by a straight portion QR of the steady running line 52b if the straight portion QR were produced.

In FIGURE 3a, the acceleration line 51b is shown as passing through the point $K_1$ which corresponds to a high $T_1$. At a high $T_1$, fuel flow will therefore continue to be reduced along the line $K_1M_1L_1$. At a low $T_1$, however, fuel flow will now be reduced along a line $K_2'$, $M_2'$, $L_2$. The engine will therefore reach steady running conditions at $M_2'$ which is a slightly higher speed than $M_2$.

It will be appreciated that the relative disposition of the parts EG and RQ of the lines 51b, 52b is such that the percentage reduction in fuel flow between $K_2'$ and $M_2'$ will be substantially the same as between $K_1$ and $M_1$. The size of the slot 358 will therefore be reduced to substantially the same extent, and the final controlled speed will be substantially the same, at all inlet temperatures.

An acceleration line 51b of the shape shown in FIGURE 3a can be obtained by opening at least part of the capsules 352 to the pressure $P_1'$ instead of evacuating the whole of the capsules. The proportion of the capsules 352 which is open to the pressure $P_1'$ is chosen to give the required point H on the line GE produced.

As stated above, the pressure in the casing 311' is $$P_1' F\left(\frac{P_2}{P_1'}\right)$$

Since $P_1'$ and $P_2$ vary with $T_1$, it follows that the effect of this variation can be reduced or cancelled out by ensuring that both the interior and the exterior of the capsules are respectively subjected to $P_1'$ and to a pressure functionally related to $P_1'$ namely $$P_1' F\left(\frac{P_2}{P_1'}\right)$$

We claim:

1. A gas turbine engine fuel system for controlling the supply of pressurized fuel from a source thereof to a burner of a gas turbine engine for burning in air from a compressor forming a part of said engine comprising a substantially cylindrical fuel supply unit, means arranged in and on the axis of said supply unit providing a metering orifice, means for supplying pressurized fuel from said source to said burner via said metering orifice, speed responsive means mechanically connected to the means providing the metering orifice to vary the size of the metering orifice in accordance with engine rotational speed, a conduit opposite ends of which are adapted to be supplied with air at pressures functionally related to the pressures of the inlet and outlet ends of said compressor, a pair of spaced restrictions in said conduit, a pressure responsive means mechanically connected to the means providing the metering orifice to vary the size of the metering orifice, means for applying to the exterior of said pressure responsive means the pressure in the space between said restrictions, a part of the pressure responsive means being evacuated and another part thereof being opened to air at the said pressure functionally related to the compressor inlet pressure and means for throttling the fuel flow to the burner in response to the pressure drop across the metering orifice.

2. A gas turbine engine fuel system as claimed in claim 1 in which the pressure responsive means comprises a bellows mounted in a chamber, said chamber communicating with the space between the restrictions.

3. A gas turbine engine fuel system for controlling the supply of pressurized fuel from a source thereof to a burner of a gas turbine engine comprising means providing a metering orifice, means for supplying pressurized fuel from said source at full pressure to said metering orifice, means to deliver fuel from the orifice to said burner, speed responsive means mechanically connected to the means providing the metering orifice, the speed responsive means varying the size of the metering orifice in accordance with engine rotational speed, a chamber, a bellows mounted within the chamber and mechanically connected to the means providing the metering orifice so as to vary the size of the latter, said bellows having two serially arranged compartments, means for supplying the interior of one of the compartments of the bellows with air at a pressure functionally related to the compressor inlet pressure, the other compartment being partially evacuated, a pair of passages communicating with said chamber and respectively adapted to be supplied with air at pressures functionally related to the pressures of the inlet and outlet ends of a compressor of the engine, a restriction in each said passages, and means for throttling the fuel flow from the orifice to the burner in accordance with the pressure drop across the metering orifice.

4. A gas turbine engine fuel system for controlling the supply of pressurized fuel from a source thereof to a burner of a gas turbine engine comprising means providing a metering orifice, means for supplying pressurized fuel from said source to said burner via said metering orifice, speed responsive means mechanically connected to the means providing the metering orifice, the speed responsive means varying the size of the metering orifice in accordance with engine rotational speed, adjustable stops engageable with the means providing the metering orifice, said stops controlling the extent to which the size of the metering orifice may be varied by the speed responsive means, a chamber, a bellows having a part evacuated mounted within the chamber and mechanically connected to the means providing the metering orifice so as to vary the size of the latter, means for supplying another tandem arranged part of the interior of the bellows with air at a pressure functionally related to the compressor inlet pressure, a pair of passages communicating with said chamber and respectively adapted to be supplied with air at pressures functionally related to the pressures of the inlet and outlet ends of a compressor of the engine, a restriction in each said passages, and means for throttling the fuel flow from the orifice to the burner in accordance with the pressure drop across the metering orifice.

5. A gas turbine engine fuel system for controlling the supply of pressurized fuel from a source thereof to main and pilot burners of a gas turbine engine for burning in air from a compressor forming a part of said engine, comprising, a substantially cylindrical fuel supply unit, means arranged in and on the axis of said supply unit providing a metering orifice, a duct for supplying pressurized fuel from said source to said metering orifice, a first means on said axis responsive to engine rotational speed, an axially movable mechanical connection connecting said first means to the means providing a metering orifice, said first means reducing the size of the metering orifice when a predetermined engine rotational speed is reached, a chamber, pressure responsive means mounted in said chamber, means for subjecting the exterior of said pressure responsive means to pressures functionally related to the pressures of the inlet and outlet ends of said compressor, an axially movable mechanical connection which directly connects the pressure responsive means to the means providing the metering orifice and which extends through the chamber and into said duct, means for effecting relative rotation of said axially movable mechanical connections, first and second conduits for conveying fuel from a downstream side of said metering orifice respectively to said main and pilot burners, a throttle valve on said axis for controlling fuel flow through said first conduit, means directly employing the fuel pressure immediately upstream of said metering orifice to urge said throttle valve in a valve closing direction, means directly employing the fuel pressure immediately downstream of said metering orifice to urge said throttle valve in a valve opening direction, and a second means on said axis responsive to engine rotational speed connected for urging said throttle valve in the valve opening direction with a pressure which increases with increasing engine rotational speed.

6. A gas turbine engine fuel system for controlling the supply of pressurized fuel from a source thereof to main and pilot burners of a gas turbine engine for burning in air from a compressor forming part of said engine comprising a substantially cylindrical fuel supply unit, means arranged in and on the axis of said supply unit providing a metering orifice, a duct for supplying pressurized fuel from said source to said metering orifice, a first means responsive to engine rotational speed, an axially movable mechanical connection which directly connects the means providing the metering orifice to the said first means, said first means reducing the size of the metering orifice only when a predetermined engine rotational speed is reached, manual means to regulate said predetermined speed, a chamber, pressure responsive means mounted in said chamber, means for subjecting the pressure responsive means to pressures functionally related to the pressure of the inlet and outlet ends of said compressor, an axially movable mechanical connection which directly connects the pressure responsive means to the means providing the metering orifice and which extends through the chamber and into said duct, means for effecting rotation of both said axially movable mechanical connections, first and second conduits for conveying fuel from the downstream side of said metering orifice respectively to said main and pilot burners, a throttle valve on said axis for controlling fuel flow through said first conduit, means for employing the fuel pressure immediately upstream of said metering orifice to urge said throttle valve in a valve closing direction, means for employing the fuel pressure immediately downstream of said metering orifice to urge said throttle valve in a valve opening direction and a second means continuously responsive to engine rotational speed for urging said throttle valve in the valve opening direction with a pressure which increases with increasing engine rotational speed, the construction being such that the full flow of fuel from said source to said burners passes through said duct, said metering orifice, said conduits and said throttle valve.

7. A gas turbine engine fuel system for controlling the supply of pressurized fuel from a source thereof to main and pilot burners of a gas turbine engine, comprising a substantially cylindrical fuel supply unit, a pair of apertured sleeves axially mounted therein the one within the other for relative axial movement, the apertures in said sleeves cooperating with each other to provide a metering orifice, means for effecting relative rotation of said sleeves, means for supplying pressurized fuel from said source to said metering orifice, a first means responsive to engine rotational speed, an axially movable mechanical connection which directly connects the said first means to one of said sleeves, said first means effecting relative axial movement of said sleeves so as to reduce the size of the metering orifice only when a predetermined engine rotational speed is reached, a chamber, pressure responsive means mounted in said chamber, means for subjecting the pressure responsive means to pressures functionally related to the pressure of the inlet and outlet ends of said compressor, an axially movable mechanical connection which directly connects the pressure responsive means to one of said sleeves, said pressure responsive means effecting relative axial movement of said sleeves so as to increase the size of the metering orifice in functional relationship with increase in the ratio of said pressures, means for effecting rotation of both said axially movable mechanical connections, first and second conduits for conveying fuel from the downstream side of said metering orifice, respectively to said main and pilot burners, a throttle valve on said axis for controlling fuel flow through said first conduit, means employing the fuel pressure immediately upstream of said metering orifice to urge said throttle valve in a valve closing direction, means employing the fuel pressure immediately downstream of said metering orifice to urge said throttle valve in a valve opening direction, and a second means continuously responsive to engine rotational speed for urging said throttle valve in the valve opening direction with a pressure which increases with increasing engine rotational speed.

8. A gas turbine engine fuel system for controlling the supply of pressurized fuel from a source thereof to main and pilot burners of a gas turbine engine, comprising a substantially cylindrical fuel supply unit, a pair of apertured sleeves axially mounted therein the one within the other for relative axial movement, one of said sleeves being in two axially spaced parts which are relatively movable axially so as to vary the size of the aperture between said parts, the apertures in said sleeves cooperating with each other to provide a metering orifice, means for relatively rotating said sleeves, means for supplying pressurized fuel from said source to the outer side of said metering orifice, a first centrifugal governor, an axially movable mechanical connection which directly connects the first centrifugal governor to one of said axially spaced parts, said centrifugal governor being arranged to reduce the space between the said axially spaced parts when a predetermined engine rotational speed is reached, a chamber, pressure responsive means mounted in said chamber, means for subjecting the pressure responsive means to pressures functionally related to the pressure of the inlet and outlet ends of said compressor, an axially movable mechanical connection which directly connects the pressure responsive means to the other sleeve for effecting relative axial movement to the sleeves so as to increase the size of the metering orifice in functional relationship with increase in the ratio of said pressures, first and second conduits for conveying fuel from the downstream side of said metering orifice through said sleeves and respectively to said main and pilot burners, a throttle valve co-axial with said sleeves for controlling fuel flow through said first conduit, means for employing the fuel pressure immediately upstream of said metering orifice to urge said throttle valve in a valve closing direction, means for employing the fuel pressure immediately downstream of the said metering orifice to urge said throttle valve in a valve opening direction, a second centrifugal governor continuously urging said throttle valve in the valve opening direction with a pressure which increases with increasing engine rotational speed, a pair of housings rotatably mounted in the supply unit for rotation about the axis thereof, and drive means drivable from the gas turbine engine for effecting rotation of the housing and sleeves, one of said governors being mounted in and rotated by each housing.

9. A gas turbine engine fuel system as claimed in claim 8 in which the pressure responsive means comprises two pressure responsive devices remote from the axis and connected to diametrically opposite sides of one of the sleeves so as to effect axial sliding movement thereof.

10. A gas turbine engine fuel system for controlling the supply of pressurized fuel from a source thereof to the burners of a gas turbine engine comprising means providing a metering orifice, a conduit for supplying pressurized fuel from said source to said metering orifice at full pressure and through it to said burner, a chamber, a bellows having two compartments in tandem, mounted in said chamber, one of said compartments being partly evacuated, means for supplying the other compartment of the bellows with air at a pressure functionally related to the pressure of the inlet end of a compressor of the engine, a pair of passages communicating with said chamber and respectively adapted to be supplied with air at pressures functionally related to the pressures of the inlet and outlet ends of the compressor, a restriction in each said passage, an axially movable mechanical connection which directly connects the bellows to the means providing the metering orifice and which extends through the chamber and into the said conduit, and means for effecting rotation of said axially movable mechanical connection.

11. A gas turbine engine fuel system as defined in claim 10 in which means is provided for effecting pressure balancing of the said axially movable mechanical connection.

12. A gas turbine engine fuel system for controlling the supply of pressurized fuel from a source thereof to the burners of a gas turbine engine comprising means providing a metering orifice, a conduit for supplying pressurized fuel from said source to said metering orifice at full pressure and through it to said burners, a chamber, a bellows mounted in said chamber and having two series arranged compartments with one partly evacuated, means for supplying the other compartment of the bellows with air at a pressure functionally related to the pressure of the inlet end of a compressor of the engine, a pair of passages communicating with said chamber and respectively adapted to be supplied with air at pressures functionally related to the pressures of the inlet and outlet ends of the compressor, a restriction in each said passage, a first axially movable mechanical connection which directly connects the bellows to the means providing the metering orifice and which extends through the chamber and into the said conduit, speed responsive means responsive to engine rotational speed, a second axially movable mechanical connection which directly connects the speed responsive means and the means providing the metering orifice, and means for effecting rotation of said first and second axially movable mechanical connections.

References Cited in the file of this patent

UNITED STATES PATENTS

| | | |
|---|---|---|
| 2,593,536 | Chamberlin et al. | Apr. 22, 1952 |
| 2,668,416 | Lee | Feb. 9, 1954 |
| 2,670,599 | Davies et al. | Mar. 2, 1954 |
| 2,714,803 | Abild | Aug. 9, 1955 |
| 2,836,957 | Fox | June 3, 1958 |
| 2,856,754 | Torell | Oct. 21, 1958 |
| 2,858,700 | Rose | Nov. 4, 1958 |
| 2,861,420 | Lewis | Nov. 25, 1958 |
| 2,934,898 | Graefe | May 3, 1960 |
| 2,950,596 | Haase et al. | Aug. 30, 1960 |

FOREIGN PATENTS

| | | |
|---|---|---|
| 211,974 | Australia | June 7, 1956 |
| 646,780 | Great Britain | Nov. 29, 1950 |
| 716,254 | Great Britain | Sept. 29, 1954 |
| 771,841 | Great Britain | Apr. 3, 1957 |